UNITED STATES PATENT OFFICE 2,514,672

ALPHA-SUBSTITUTED ACRYLIC ACID ESTERS AND PROCESS OF PREPARATION

Delbert D. Reynolds and William O. Kenyon, Rochester, N. Y., assignors to Eastman Kodak Company, Rochester, N. Y., a corporation of New Jersey No Drawing. Application April 21, 1948, Serial No. 22,504

10 Claims. (Cl. 260—484)

The present invention relates to α-substituted acrylic acid esters and a process for preparing them.

Esters of acrylic acid have long been recognized as important in the preparation of synthetic resins. The α-substituted derivatives of these esters, such as the esters of α-methylacrylic acid, have found even greater utility in the field of synthetic resins. We have now found a new process for preparing still other α-substituted acrylic acid esters, which can be either homopolymerized or interpolymerized with another copolymerizable, unsaturated compound to give useful synthetic resins.

It is therefore an object of our invention to provide an improved process for preparing esters of α-substituted acrylic acids. A further object is to provide new compounds which are useful as intermediates in the preparation of α-substituted acrylic acid esters. A still further object of our invention is to provide α-substituted acrylic acid esters which are useful in the preparation of synthetic resins. Other objects will become apparent from a consideration of the following description.

According to the process of our invention we prepare our new α-substituted acrylic acid esters by interacting an ester of acrylic acid with tertiary butyl hypochlorite and an aliphatic carboxylic acid. The resulting reaction mixture is reacted with an organic or inorganic base to give in addition to a substantial portion of an ester of an α-acyloxyacrylic acid, a quantity of an ester of α-chloroacrylic acid. These esters can conveniently be separated from one another by any of the means commonly employed by those skilled in the art, e. g. distillation. The process of our invention can conveniently be illustrated by the following equations:

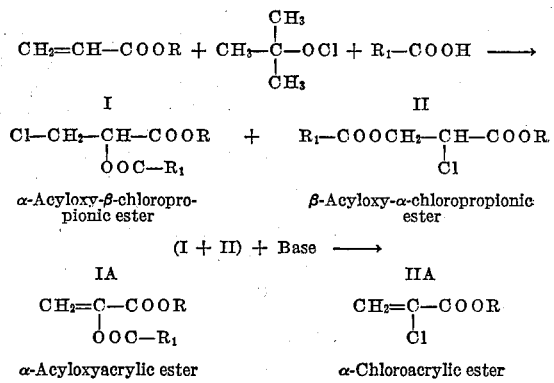

wherein R and R₁ have the definitions set forth below. From the above equation it can be seen that upon reacting with the base, product I gives product IA, while product II gives product IIA.

The esters of acrylic acid which can advantageously be used in practicing the process of our invention can be represented by the formula:

$$CH_2=CH-COOR$$

wherein R represents an alkyl group, such as methyl, ethyl, propyl, isopropyl, n-butyl, secondary and tertiary butyl, etc., (i. e. an alkyl group of the formula $C_nH_{2n+1}$ wherein $n$ is a positive integer from 1 to 4), a benzyl group and a β-phenylethyl group. Typical esters include methyl acrylate, ethyl acrylate, propyl acrylate, isopropyl acrylate, n-butyl acrylate, secondary butyl acrylate, tertiary butyl acrylate, benzyl acrylate, β-phenylethyl acrylate, etc.

The aliphatic carboxylic acids which we can use can advantageously be represented by the formula:

$$R_1-COOH$$

wherein R₁ represents a number selected from the group consisting of a methyl group, an ethyl group, a propyl group, an isopropyl group, etc. Typical acids include acetic acid, propionic acid, n-butyric acid, isobutyric acid etc. The most favorable yields in our process are obtained when the acids used are in substantially anhydrous condition. Although small amounts of water can be tolerated, large quantities of water should not be present because of the effect produced on the tertiary butyl hypochlorite and the inherent hydrolysis of the product esters in acid solution.

Solvents can also be used in practicing the process of our invention, although there is ordinarily no advantage in using them, since the aliphatic carboxylic acids themselves are excellently suited as solvents. Dehydrating solvents such as the anhydrides corresponding to the carboxylic acids used, can be employed if desired. When a solvent is used, care should be taken to select one which is not reactive with an olefinic double bond, since undesirable side reactions might take place. Useful solvents include, 1,4-dioxane, diethyl ether, diisopropyl ether, benzene, toluene, etc. Alcohols are not suitable solvents since they react readily with the olefinic double bond under the conditions employed in our process.

The temperatures at which our esters of acrylic acid react with tertiary butyl hypochlorite and an aliphatic carboxylic acid vary and are usually a function of the reactants employed. Generally temperatures from about 20° C. to 70° C. can be used, although lower or higher temperatures can be employed depending on the properties of the particular reagents.

The bases used in our process can be either inorganic or organic, although the organic bases have been found to be especially useful. The organic bases which we can advantageously use are represented by the organic tertiary amines, such as pyridine, quinoline, isoquinoline, dimethylaniline, diethylaniline, trimethylamine, triethylamine, tri-n-propylamine, tri-n-butylamine, etc.

The following examples will illustrate further the manner whereby we practice the process of our invention.

*Example I.—Ethyl α-acetoxy-β-chloropropionate and ethyl-β-acetoxy-α-chloropropionate*

To a mixture of 1000 grams of ethyl acrylate, 1500 cc. of glacial acetic acid and 500 cc. of acetic anhydride, 50 grams of copper acetate were added, and the mixture stirred to insure intimate mixing. After the addition of 1085 grams of freshly distilled tertiary butyl hypochlorite, the temperature of the reaction mixture rose to 70° C. The reaction mixture was cooled to 60° C., and over a period of about one hour the temperature again rose to 65° C. and then slowly fell to room temperature. After stirring overnight, the reaction mixture was filtered, and the filtrate distilled. A fraction of 1093 grams, boiling at 111° C./15 mm., which was proved to be a mixture of ethyl α-acetoxy-β-chloropropionate and ethyl β-acetoxy-α-chloropropionate, was obtained as a distillate.

When a molecularly equivalent amount of benzyl acrylate replaces the ethyl acrylate in the above example, a mixture of benzyl α-acetoxy-β-chloropropionate can be obtained. Similarly when a molecularly equivalent amount of n-butyric acid replaces the glacial acetic acid, a mixture of ethyl α-butyroxy-β-chloropropionate and ethyl β-butyroxy-α-chloropropionate can be obtained.

*Example II.—Ethyl α-acetoxyacrylate and ethyl α-chloroacrylate*

The mixture of esters obtained in Example I above was added to one liter of quinoline, and the resulting mixture heated on an oil bath at 125° for 24 hours. The reaction mixture was then fractionated under reduced pressure. The first fraction of 229 grams distilled at 43 to 46° C./15 mm. and proved to be ethyl α-chloroacrylate. A second fraction of 400 grams, boiling at 80 to 85° C./15 mm., was found to be ethyl α-acetoxyacrylate. These fractions were then further purified by refractionation to give products useful in the preparation of synthetic polymers.

When the mixture of benzyl α-acetoxy-β-chloropropionate and benzyl β-acetoxy-α-chloropropionate, prepared as described above, is reacted with quinoline, a mixture of benzyl α-acetoxyacrylate and benzyl α-chloroacrylate results. This mixture can be separated into its component parts by fractional distillation as described in Example II. Similarly when the mixture of ethyl α-butyroxy-α-chloropropionate and ethyl β-butyroxy-α-chloropropionate, prepared as described above, are treated with pyridine, a mixture, which can be separated into its components, of ethyl α-butyroxyacrylate and ethyl α-chloroacrylate can be obtained.

*Example III.—Methyl α-acetoxy-β-chloropropionate and methyl β-acetoxy-α-chloropropionate*

A mixture of 86 grams of methyl acrylate, 200 cc. of glacial acetic acid and 10 grams of copper chloride was stirred while 108.5 grams of teritary butyl hypochlorite was slowly added. The addition of the tertiary butyl hypochlorite required three hours and during the addition the temperature was kept below 30° C. by cooling. The reaction mixture after standing overnight was distilled under a vacuum. The fraction, boiling at 55 to 65° C./1 to 2 mm., was fractionally distilled to give a mixture of 48 grams of methyl α-acetoxy-β-chloropropionate and methyl β-acetoxy-α-chloropropionate boiling at 95 to 96° C./9 mm. Upon analysis this mixture was found to contain 40.5% carbon, 5.31% hydrogen and 20.4% chlorine.

*Example IV.—Methyl α-acetoxyacrylate and methyl α-chloroacrylate*

When the ester mixture from Example III is reacted with 100 cc. of quinoline at 125° for 24 hours as described in Example II above, a reaction mixture consisting of methyl α-acetoxyacrylate and methyl α-chloroacrylate is obtained. Upon fractionation at reduced pressure, methyl α-acetoxyacrylate boiling at 63 to 64° C./10 mm. and methyl α-chloroacrylate boiling at 31 to 34° C./21 mm. is obtained.

Operating in a similar manner other α-substituted acrylic acid esters can be prepared. For example, n-butyl α-acetoxyacrylate and n-butyl α-chloroacrylate can be prepared from n-butyl acrylate and acetic acid (plus tertiary butyl hypochlorite), isopropyl α-acetoxyacrylate and isopropyl α-chloroacrylate can be obtained from isopropyl acrylate and acetic acid (plus tertiary butyl hypochlorite). As noted above, these esters are useful in the preparation of synthetic resins suitable for molding, extruding into films, and the like.

What we claim and desire secured by Letters Patent of the United States is:

1. A process for preparing esters of α-substituted acrylic acids comprising reacting an ester represented by the formula:

$$CH_2=CH-COOR$$

wherein R represents a member selected from the group consisting of an alkyl group of the formula $C_nH_{2n+1}$ wherein $n$ is a positive integer from 1 to 4, a benzyl group, and a β-phenylethyl group, with tertiary butyl hypochlorite and an acid represented by the formula:

$$R_1-COOH$$

wherein $R_1$ represents a member selected from the group consisting of a methyl group, an ethyl group, a propyl group and an isopropyl group, to give a mixture of an ester of an α-acyloxy-β-chloropropionic acid and an ester of a β-acyloxy-α-chloropropionic acid, and thereafter reacting this mixture of esters with an organic tertiary amine to give α-substituted acrylic acid esters represented by the following two formulas:

$$CH_2=C-COOR$$
$$|$$
$$OOCR_1$$

and $$CH_2=C-COOR$$
$$|$$
$$Cl$$

wherein R represents a member selected from the group consisting of an alkyl group of the formula $C_nH_{2n+1}$ wherein $n$ is a positive integer from 1 to 4, a benzyl group and a β-phenylethyl group, and $R_1$ represents a member selected from the group consisting of a methyl group, an ethyl group, a propyl group and an isopropyl group.

2. A process for preparing esters of α-substituted acrylic acids comprising reacting an ester represented by the formula:

$$CH_2=CH-COOR$$

wherein R represents a member selected from the group consisting of an alkyl group of the formula $C_nH_{2n+1}$ wherein $n$ is a positive integer from 1 to 4, a benzyl group, and a β-phenylethyl group, with tertiary butyl hypochlorite and an acid represented by the formula:

$$R_1-COOH$$

wherein $R_1$ represents a member selected from the group consisting of a methyl group, an ethyl group, a propyl group and an isopropyl group, to give a mixture of an ester of an α-acyloxy-β-chloropropionic acid and an ester of a β-acyloxy-α-chloropropionic acid, and thereafter reacting this mixture of esters with quinoline to give α-substituted acrylic acid esters represented by the following two formulas:

$$CH_2=C-COOR$$
$$\phantom{CH_2=C-}OOCR_1$$

and $$CH_2=C-COOR$$
$$\phantom{CH_2=C-}Cl$$

wherein R represents a member selected from the group consisting of an alkyl group of the formula $C_nH_{2n+1}$ wherein $n$ is a positive integer from 1 to 4, a benzyl group and a β-phenylethyl group, and $R_1$ represents a member selected from the group consisting of a methyl group, an ethyl group, a propyl group and an isopropyl group.

3. A process for preparing ethyl α-acetoxyacrylate and ethyl α-chloroacrylate comprising reacting ethyl acrylate with tertiary butyl hypochlorite and acetic acid to give a mixture of ethyl α-acetoxy-β-chloropropionate and ethyl β-acetoxy-α-chloroprionate, thereafter reacting this mixture of esters with an organic tertiary amine to give a mixture of ethyl α-acetoxyacrylate and ethyl α-chloroacrylate, and separating these esters from one another by fractional distillation.

4. A process for preparing ethyl α-acetoxyacrylate and ethyl α-chloroacrylate comprising reacting ethyl acrylate with tertiary butyl hypochlorite and acetic acid to give a mixture of ethyl α-acetoxy-β-chloroprionate and ethyl β-acetoxy-α-chloropropionate, thereafter reacting this mixture of esters with quinoline to give a mixture of ethyl α-acetoxyacrylate and ethyl α-chloroacrylate, and separating these esters from one another by fractional distillation.

5. A process for preparing methyl α-acetoxyacrylate and methyl α-chloroacrylate comprising reacting methyl acrylate with tertiary butyl hypochlorite and acetic acid to give a mixture of methyl α-acetoxy-β-chloropropionate and methyl β-acetoxy-α-chloropropionate, thereafter reacting this mixture of esters with an organic tertiary amine to give a mixture of methyl α-acetoxyacrylate and methyl α-chloroacrylate, and separating these esters from one another by fractional distillation.

6. A process for preparing methyl-α-acetoxyacrylate and methyl α-chloroacrylate comprising reacting methyl acrylate with tertiary butyl hypochlorite and acetic acid to give a mixture of methyl α-acetoxy-β-chloroprionate and methyl β-acetoxy-α-chloroprionate, thereafter reacting this mixture of esters with quinoline to give a mixture of methyl α-acetoxyacrylate and methyl α-chloroacrylate, and separating these esters from one another by fractional distillation.

7. A process for preparing a mixture of an ester of an α-acyloxy-β-chloroprionic acid and an ester of a β-acyloxy-α-chloroprionic acid comprising reacting an ester represented by the formula:

$$CH_2=CH-COOR$$

wherein R represents a member selected from the group consisting of an alkyl group of the formula $C_nH_{2n+1}$ wherein $n$ is a positive integer from 1 to 4, a benzyl group, and a β-phenylethyl group, with tertiary butyl hypochlorite and an acid represented by the formula:

$$R_1-COOH$$

wherein $R_1$ represents a member selected from the group consisting of a methyl group, an ethyl group, a propyl group and an isopropyl group.

8. A process for preparing a mixture of ethyl α-acetoxy-β-chloropropionate and ethyl β-acetoxy-α-chloropropionate comprising reacting ethyl acrylate with tertiary butyl hypochlorite and acetic acid.

9. A process for preparing a mixture of methyl α-acetoxy-β-chloropropionate and methyl β-acetoxy-α-chloroprionate comprising reacting methyl acrylate with tertiary butyl hypochlorite and acetic acid.

10. The compound represented by the formula:

$$CH_3COOCH_2-CH-COOC_2H_5$$
$$\phantom{CH_3COOCH_2-}Cl$$

DELBERT D. REYNOLDS.
WILLIAM O. KENYON.

No references cited.